(12) United States Patent
Gunda et al.

(10) Patent No.: US 10,275,466 B2
(45) Date of Patent: *Apr. 30, 2019

(54) DE-DUPLICATION AWARE SECURE DELETE (71) Applicant: International Business Machines Corporation, Armonk, NY (US)

(72) Inventors: Kalyan C. Gunda, Bangalore (IN); Sandeep R. Patil, Pune (IN); Subhojit Roy, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 960 days.

This patent is subject to a terminal disclaimer.

(21) Appl. No.: 14/798,037

(22) Filed: Jul. 13, 2015

(65) Prior Publication Data

US 2017/0017664 A1 Jan. 19, 2017
US 2017/0132242 A9 May 11, 2017

Related U.S. Application Data (63) Continuation of application No. 13/740,735, filed on Jan. 14, 2013, now Pat. No. 9,104,839.

(51) Int. Cl.
*G06F 12/12* (2016.01)
*G06F 17/30* (2006.01)

(52) U.S. Cl.
CPC .. *G06F 17/30156* (2013.01); *G06F 17/30097* (2013.01); *G06F 17/30117* (2013.01)

(58) Field of Classification Search
CPC combination set(s) only.
See application file for complete search history.

(56) References Cited

U.S. PATENT DOCUMENTS 6,070,174 A   5/2000  Starek et al.
6,314,437 B1  11/2001 Starek et al.
6,731,447 B2  5/2004  Bunker et al.
(Continued)

OTHER PUBLICATIONS

Data Domain Introduces Secure Data Shredding for Deduplication Storage, Press Release May 18, 2009, downloaded from Reuters on Aug. 17, 2012, http://www.reuters.com/article/2009/05/18/idUS93873+18-May-2009+MW20090518[Aug. 17, 2012 12:09:55 PM], 4 pages.
(Continued)

*Primary Examiner* — Yong J Choe
(74) *Attorney, Agent, or Firm* — Stephen R. Tkacs; Stephen J. Walder, Jr.; Robert M. Sullivan (57) ABSTRACT

A mechanism is provided in a data processing system for de-duplication aware secure delete. Responsive to receiving a secure delete request for a file, the mechanism identifies a list of file blocks to be securely deleted from a physical disk device. Responsive to determining at least one virtual block of another file refers to a given disk block corresponding to a file block in the list, the mechanism copies the given disk block to generate a copied disk block in the physical disk device and updates a pointer of the at least one virtual block to refer to the copied disk block. The mechanism writes a secure delete pattern for each file block in the list of file blocks to a disk block in the physical disk device without performing de-duplication processing.

20 Claims, 6 Drawing Sheets

(56) References Cited

U.S. PATENT DOCUMENTS

| | | | |
|---|---|---|---|
| 7,650,473 | B1 | 1/2010 | Tormasov et al. |
| 7,831,560 | B1 | 11/2010 | Spertus et al. |
| 7,975,119 | B2 | 7/2011 | Erez |
| 2003/0079078 | A1 | 4/2003 | Zipprich et al. |
| 2006/0117153 | A1 | 6/2006 | Tran et al. |
| 2008/0010326 | A1 | 1/2008 | Carpenter et al. |
| 2008/0016132 | A1 | 1/2008 | Merhar |
| 2010/0174865 | A1 | 7/2010 | Koester |
| 2010/0250896 | A1 | 9/2010 | Matze |
| 2011/0154060 | A1 | 6/2011 | Guyot et al. |
| 2014/0149476 | A1* | 5/2014 | Kishimoto ............ G06F 3/0613 707/827 |

OTHER PUBLICATIONS

Department of Defense, DoD 5220.22-M National Security Program Operating Manual (NISPOM) Jan. 1995, http://www.usaid.gov/policy/ads/500/d522022m.pdf (p. 58).

The Department of the Navy Remanence Security Guidebook, Sep. 1993, http://www.fas.org/irp/doddir/navy/5239_26.htm (section 3.3.1.c ), 19 pages.

U.S. Appl. No. 13/740,735.

"Greener Method for Data Deduplication with Secure Data Remanence", IP.com No. IPCOM000198559D, www.ip.com, http://ip.com/IPCOM/000198559, Aug. 9, 2010, 4 pages.

"Guttman Method", http://en.wikipedia.org/wiki/Gutmann_method, retrived on Aug. 17, 2012, 6 pages.

"Technical Security Standard for Information Technology (TSSIT)", Royal Canadian Mounted Police Technical Security Standard for Information Technology, Appendix OPS-II—Media Sanitization, Aug. 1997, 81 pages, http://www.iwar.org.uk/comsec/resources/standards/canada/tssit97e.pdf.

Gutmann, Peter, "Secure Deletion of Data from Magnetic and Solid-State Memory", Sixth USENIX Security Symposium Proceedings, San Jose, CA, Jul. 22-25, 1996, http://www.cs.auckland.ac.nz/~pgut001/pubs/secure_del.html), 17 pages.

Hughes, Gordon et al., "Tutorial on Disk Drive Data Sanitization", http://www.erasedigital.be/pdf/Data%20Sanitize%20Tutorial.pdf, Sep. 2006, 15 pages.

Storer, Mark W. et al., "Secure Data Deduplication", ACM, StorageSS'08, Oct. 31, 2008, Fairfax, Virginia, http://www.ssrc.ucsc.edu/Papers/storer-storagess08.pdf, 10 pages.

"Data deduplication", http://en.wikipedia.org/wiki/Data_deduplication, retrieved on Jan. 10, 2013, 6 pages.

* cited by examiner

| DISK BLOCK | STATUS | HASH VALUE | VIRTUAL BLOCKS REFERRING |
|---|---|---|---|
| 0 | ALLOCATED | 1123DA12E34 | VBLOCK0, VBLOCK100 |
| 1 | ALLOCATED | 345B5689DAC | VBLOCK1, VBLOCK3 |
| 2 | ALLOCATED | 678456ECFBA | VBLOCK2 |
| 3 | FREED | --- | --- |
| 4 | ALLOCATED | 37891654ABC | VBLOCK3, VBLOCK5 |
| 5 | FREED | --- | --- |

FIG. 6

| SECURE DELETE ID | DISK BLOCK | VIRTUAL BLOCKS REFERRING |
|---|---|---|
| 1 | 20 | VBLOCK20 |
| 1 | 21 | VBLOCK21 |
| 1 | 24 | VBLOCK22 |
| 1 | 25 | VBLOCK23 |
| 2 | 45 | VBLOCK33 |
| 2 | 48 | VBLOCK34, VBLOCK37 |
| 2 | 56 | VBLOCK35 |

DE-DUPLICATION AWARE SECURE DELETE

BACKGROUND

The present application relates generally to an improved data processing apparatus and method and more specifically to mechanisms for de-duplication aware secure delete.

Data de-duplication is a storage concept where redundant data are eliminated to significantly shrink storage requirements and improve bandwidth efficiency. Data de-duplication is a specialized data compression technique for eliminating duplicate copies of repeating data. The technique is used to improve storage utilization and can also be applied to network data transfers to reduce the number of bytes that must be sent. In the de-duplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times, the amount of data that must be stored or transferred can be greatly reduced.

In the de-duplication process, duplicate data is deleted, leaving only one copy of the data to be stored. This single copy is called the master copy, and in place of the deleted copies (secondary copies) the file system keeps a reference pointer, which points to the master copy. When de-duplication is performed on in-band traffic, it is referred to as in-line de-duplication.

Secure delete, also referred to as data clearing or data wiping, is a software-based method of overwriting data that completely destroys electronic data residing on a hard disk drive or other digital media. Unlike degaussing and physical destruction, which render the storage media unusable, secure delete techniques remove all information while leaving the disk operable, preserving information technology (IT) assets and environment.

Software-based overwriting uses software applications to write patterns of random meaningless data onto all of a hard drive's sectors. Center for Magnetic Recording Research (CMRR) defines a set of standards for secure delete on disk devices. Secure delete of a file requires performing multiple writes of the patterns on the file blocks. These writes must be performed directly on the physical device.

SUMMARY

In one illustrative embodiment, a method, in a data processing system, is provided for de-duplication aware secure delete. The method comprises responsive to receiving a secure delete request for a file, identifying a list of file blocks to be securely deleted from a physical disk device. The method further comprises responsive to determining at least one virtual block of another file refers to a given disk block corresponding to a file block in the list, copying the given disk block to generate a copied disk block in the physical disk device. The method further comprises updating a pointer of the at least one virtual block to refer to the copied disk block. The method further comprises writing a secure delete pattern for each file block in the list of file blocks to a disk block in the physical disk device without performing de-duplication processing.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism to make a de-duplication engine aware of a secure delete write for file blocks such that secure delete write blocks will not be considered for the de-duplication process. The mechanism then performs these writes directly on the physical disk blocks. In the de-duplication table, fi the given disk blocks are already referred by the blocks belonging to some other files, the mechanism creates a separate copy of the blocks. In this case, the de-duplication engine can inform the secure delete logic about the copied blocks.

The illustrative embodiments provide a mechanism where on the secure delete request of the file, the secure delete logic communicates with the de-duplication engine for special consideration of the file blocks. The mechanism may duplicate blocks within the file to be secure deleted. The de-duplication engine identifies a list of unique disk blocks for the file. If a given disk block is referred by another file block, the mechanism assigns a new disk block for other file blocks referring to the current disk block. The de-duplication engine may maintain a block ignore list data structure to avoid de-duplication processing on the identified disk blocks.

In one embodiment, the secure delete procedure can mark an ignored block with a special flag. Once all pointers of that block are removed/freed, the mechanism may add that block to the free block list. Before adding to the free list, the mechanism may check the special flag. If the flag is marked, the secure delete procedure can be performed on that disk block, and the block will be added to the free list.

Figure 1:
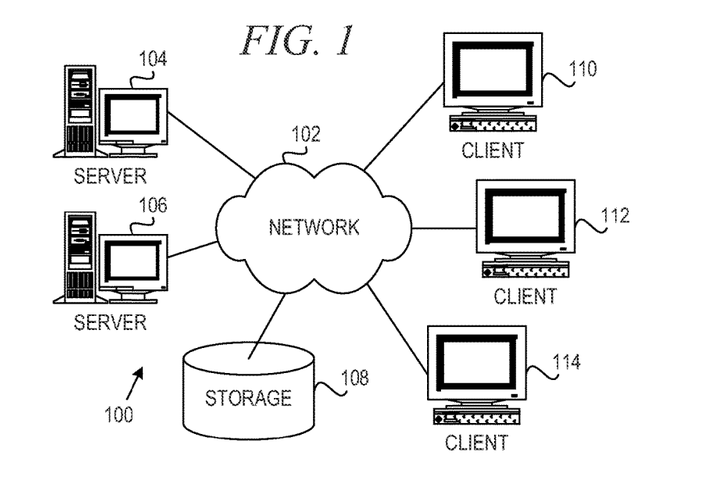
FIG. 1 depicts a pictorial representation of an example distributed data processing system in which aspects of the illustrative embodiments may be implemented.
Figure 2:
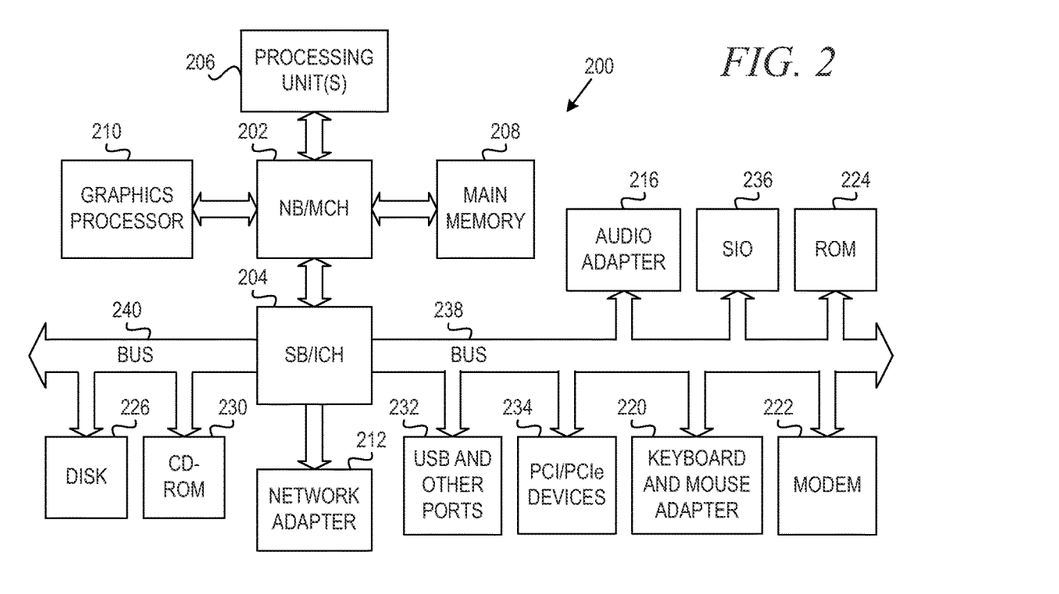
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System P® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
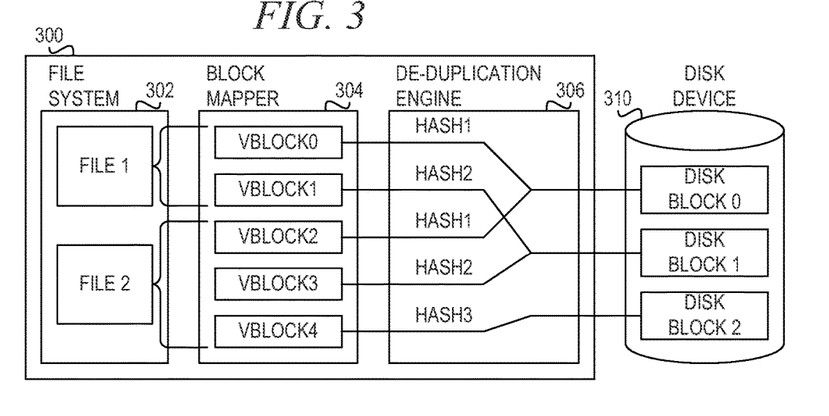
FIG. 3 is a block diagram of a server integrated with a de-duplication engine in which aspects of the illustrative embodiments may be implemented.

FIG. 3 is a block diagram of a server integrated with a de-duplication engine in which aspects of the illustrative embodiments may be implemented. Server 300 includes a file system 302, block mapper 304, and de-duplication engine 306. File system 302 stores file 1 and file 2 in physical disk device 310. Block mapper 304 maps file 1 to virtual blocks vblock0 and vblock1 and maps file 2 to virtual blocks vblock2, vblock3, and vblock4.

Figure 5:
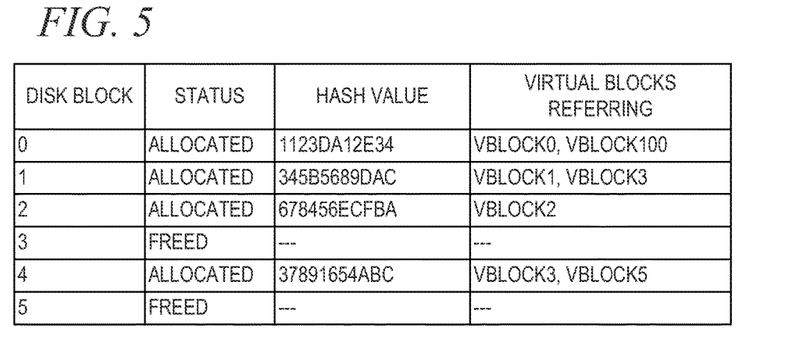
FIG. 5 illustrates a de-duplication information table in accordance with an illustrative embodiment.

De-duplication engine 306 performs a hash on each virtual block and eliminates redundant data to shrink storage requirements and improve bandwidth efficiency. In the depicted example, de-duplication engine 306 stores five virtual blocks vblock0, vblock1, vblock2, vblock3, and vblock4 as three disk blocks in disk device 310: disk block 0, disk block 1, and disk block 2. The virtual blocks vblock0 and vblock2 have the same hash; therefore, de-duplication engine 306 stores vblock0 as disk block 0 and stores vblock2 as a reference to disk block 0. The virtual blocks vblock1 and vblock3 have the same hash; therefore, de-duplication engine 306 stores vblock1 as disk block 1 and stores vblock3 as a reference to disk block 1. De-duplication engine 306 keeps a de-duplication table (not shown in FIG. 3) to map disk blocks to hash values and referring virtual blocks. An example of a de-duplication table is shown in FIG. 5, described below.

Secure delete on a file is performed in multiple steps. In each step, a specific pattern is written to every disk block of the file. For a write operation, de-duplication engine 306 computes a hash of the block in the write request. If the hash matches with any existing blocks, the virtual block in the given write request will simply point to the existing disk block and the write will not be performed on the disk.

Figure 4A:
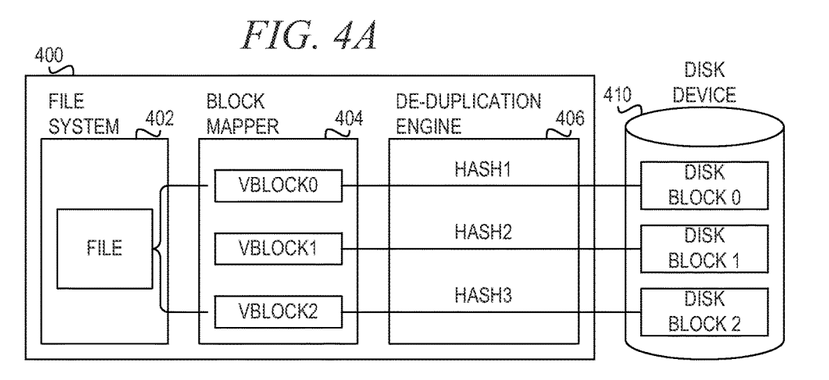
FIGS. 4A and 4B are block diagrams illustrating a server performing secure delete with data de-duplication in which aspects of the illustrative embodiments may be implemented.
Figure 4B:
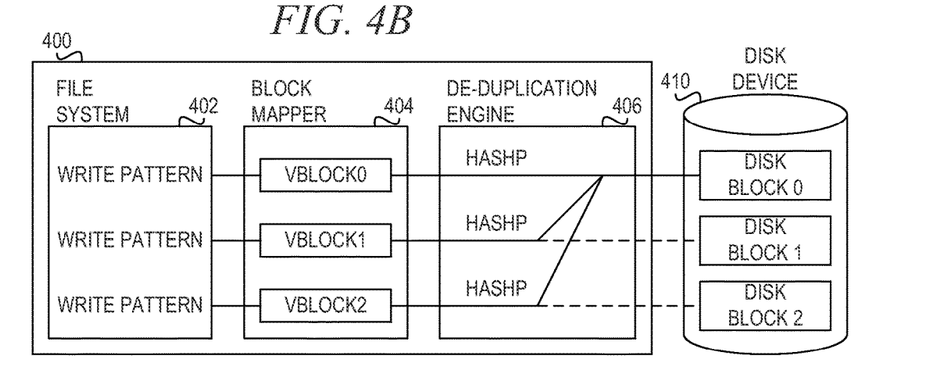

FIGS. 4A and 4B are block diagrams illustrating a server performing secure delete with data de-duplication in which aspects of the illustrative embodiments may be implemented. With reference to FIG. 4A, server 400 includes a file system 402, block mapper 404, and de-duplication engine 406. File system 402 stores a file in physical disk device 410. Block mapper 404 maps the file to virtual blocks vblock0, vblock1, and vblock2. De-duplication engine 406 performs a hash on each virtual block. In the depicted example, vblock0, vblock1, and vblock2 have different hashes and, therefore, are stored as separate disk blocks: disk block 0, disk block 1, and disk block 2, respectively.

If a user is writing to vblockP, which is currently mapped to disk block P, and its hash matches disk block M, currently referred by vblockM, then vblockP will point to disk block M, and disk block P will be freed. Thus, the write for vblockP will not be performed on the physical disk. This gives performance improvement as the number of disk writes is optimized.

However, data de-duplication results in undesirable behavior for the secure delete mechanism, where writes must go to the physical disks. The problem is with the secure delete implementation in the de-duplication engine environment. As shown in FIG. 4A, the file has three virtual blocks mapped to three different disk blocks on the disk device 410. Turning to FIG. 4B, the secure delete mechanism writes a pattern on every block of the file. For vblock0, the de-duplication engine 406 generates hashP, and the de-duplication writes the pattern to disk block 0 in disk device 410. For vblock1, because the write pattern is identical, the de-duplication engine 406 generates the same hashP, and the de-duplication does not perform a write to disk block 1. Rather, the de-duplication engine 406 will simply point to disk block 0 for vblock1, freeing disk block 1, which still contains the data to be securely deleted. Similarly, for vblock2, de-duplication engine 406 generates the same hashP, and disk block 2 is not securely deleted.

For secure delete on the file, only the first block, disk block 0, is written to disk with the write pattern. The remaining blocks, disk block 1 and disk block 2, will simply be freed, leaving them in an insecure state. In fact, for the first block, if the hashP value is matching with another existing block for another file, then even the first block, disk block 0, may not be written with the secure delete write pattern. Thus, the secure delete process does not perform its intended function.

One solution may be to bypass the de-duplication engine for secure delete writes. However, it is difficult to manage as disk blocks may be referred to by other files. Bypassing the de-duplication engine and writing directly to the disk device might corrupt data for those referring files. Another solution may be to have a separate storage for files that must be securely deleted. Because normal files and secure delete files can be part of the same file system or marked under the same policy, it is difficult to manage separate secure delete storage from the file system layer. Also, at the time of creation, the user might not be aware that a file must be securely deleted. This solution also results in inefficient usage of the storage space, as it eliminates the possibility of de-duplication across sets of files marked secure delete.

In accordance with an illustrative embodiment, a mechanism makes the de-duplication engine aware of the secure delete write for file blocks such that the secure delete write blocks will not be considered for the de-duplication process. Writes for these blocks are performed directly on the physical disk blocks. In the de-duplication table, if the given disk blocks are already referred by blocks belonging to some other file or files, then the mechanism creates a separate copy of the blocks. In this case, the de-duplication logic can inform the secure delete logic about copied blocks.

FIG. 5 illustrates a de-duplication information table in accordance with an illustrative embodiment. This table contains an entry for each disk block, with its state as allocated or freed, the hash value, and the list of virtual blocks referring to this disk block. For any write request on a virtual block, the de-duplication engine computes a hash. If the hash matches with existing entries in the de-duplication information table, the virtual block entry is added to the virtual blocks referring column, avoiding the need for a physical disk write. If no matching entry is found, the de-duplication engine searches the de-duplication information table for a free block, assigns the virtual block to a free disk block, and updates the corresponding row of the table with the hash value and virtual block referring, marking the disk block as allocated. The server then performs a write for this virtual block to the corresponding disk block on the physical device.

For a read request, the de-duplication engine refers to the de-duplication information table to identify the associated disk block. The server then performs the read operation on the identified disk block.

The illustrative embodiments provide a mechanism where on a secure delete request, the secure delete logic communicates with the de-duplication engine for special consideration of the file blocks. This communication may be done either using a separate protocol channel, such as remote procedure call (RPC), or a new command or using existing commands, such as using reserved bits of a small computer system interface (SCSI) write command descriptor block (CDB). The mechanism may duplicate blocks within the file to be secure deleted. The de-duplication engine identifies a list of unique disk blocks for the file. If a given disk block is referred by another file block, the mechanism assigns a new disk block for other file blocks referring to the current disk block. The de-duplication engine may maintain a block ignore list data structure to avoid de-duplication processing on the identified disk blocks.

Figure 6:
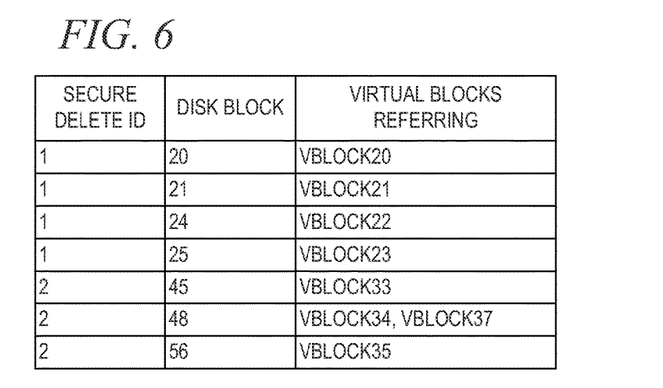
FIG. 6 illustrates an ignore block list data structure in accordance with an illustrative embodiment.

FIG. 6 illustrates an ignore block list data structure in accordance with an illustrative embodiment. Each secure delete of a file will have a unique identifier (ID). The ignore block list includes an entry for each disk block to be ignored by the de-duplication engine. Each entry includes a secure delete ID for the secure delete operation affecting the disk block and a list of the virtual blocks referring to the disk block.

In one embodiment, the secure delete procedure can mark an ignored block with a special flag. Once all pointers of that block are removed/freed, the mechanism may add that block to the free block list. Before adding to the free list, the mechanism may check the special flag. If the flag is marked, the secure delete procedure can be performed on that disk block, and the block will be added to the free list at an end of the secure delete operation for the file.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 7:
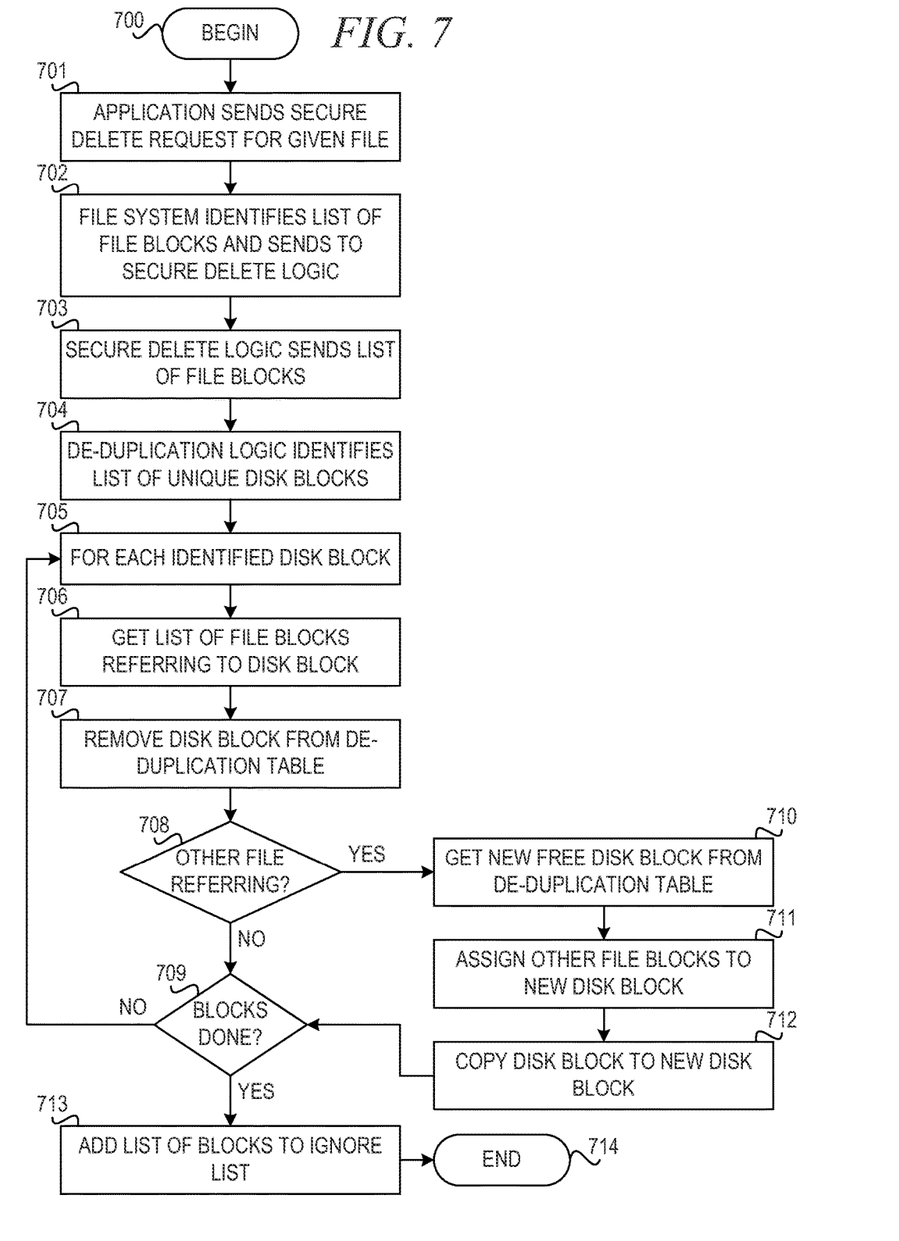
FIG. 7 is a flowchart illustrating operation of a mechanism for starting a secure delete in accordance with an illustrative embodiment.

FIG. 7 is a flowchart illustrating operation of a mechanism for starting a secure delete in accordance with an illustrative embodiment. Operation begins (block 700), and the application sends a secure delete request for a given file (block 7001). The file system identifies a list of file blocks for the secure delete and sends the list to secure delete logic (block 702). The secure delete logic sends the list of file blocks for secure delete to the de-duplication logic (block 703).

The de-duplication logic identifies the list of unique disk blocks for secure delete (block 704). This is the list of unique disk blocks in the physical storage that must be added to the ignore list. For each identified disk block (block 705), the mechanism refers to the de-duplication information table to get the list of file blocks referring to the disk block (block 706). The mechanism removes the disk block from the de-duplication table (block 707). Then, the mechanism determines whether there are other files referring to the disk block (block 708). If there are no other files referring to the disk block, the mechanism determines whether the block is the last in the list of blocks for secure delete (block 709). If the current block is not the last block, operation returns to block 705 to consider the next block in the list.

If there are other files referring to the disk block in block 708, the mechanism gets a new free disk block indicated from the de-duplication information table (block 710). The mechanism assigns the other file blocks to the new disk block (block 711). Then, the mechanism copies the data of the disk block to the new disk block (block 712). The mechanism then determines whether the block is the last in the list of blocks for secure delete (block 709). If the current block is not the last block, operation returns to block 705 to consider the next block in the list.

If the current block is the last block in block from the list in block 709, then the mechanism adds the blocks to an ignore list with the secure delete ID (block 713). Thereafter, operation ends (block 714).

Figure 8:
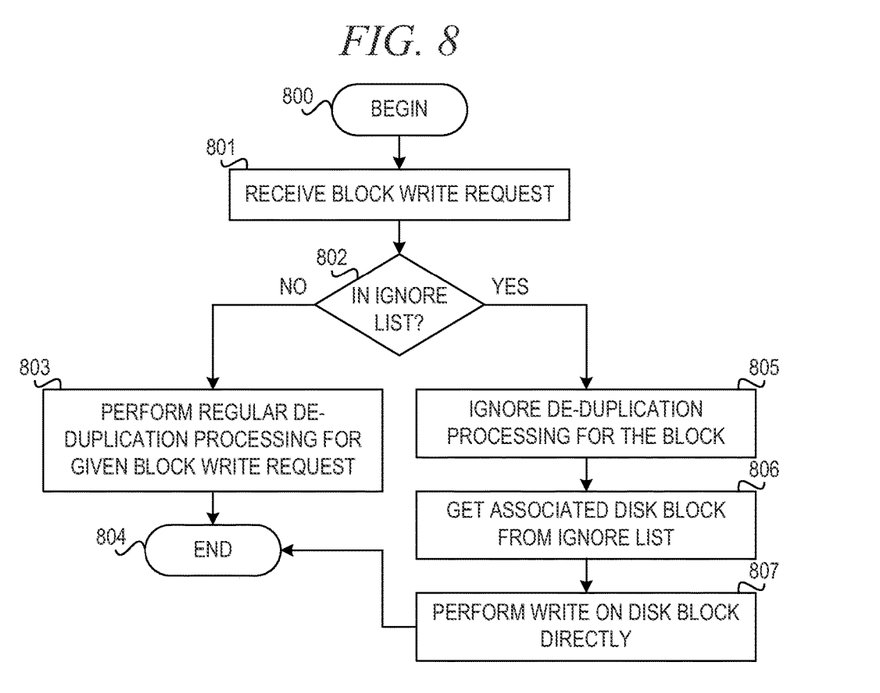
FIG. 8 is a flowchart illustrating operation of a mechanism for performing a block write at the de-duplication engine in accordance with an illustrative embodiment.

FIG. 8 is a flowchart illustrating operation of a mechanism for performing a block write at the de-duplication engine in accordance with an illustrative embodiment. Operation begins (block 800), and the mechanism receives a block write request (block 801). The mechanism determines whether the block is in the ignore list (block 802). If the block is not in the ignore list, the mechanism performs the regular de-duplication processing for the given block write request (block 803). Thereafter, operation ends (block 804).

If the block to be written is in the ignore list in block 802, the mechanism ignores de-duplication processing for the block (block 805). The mechanism gets an associated disk block from the ignore list (block 806). The mechanism then performs the write on the disk block directly (block 807). Thereafter, operation ends (block 804).

Figure 9:
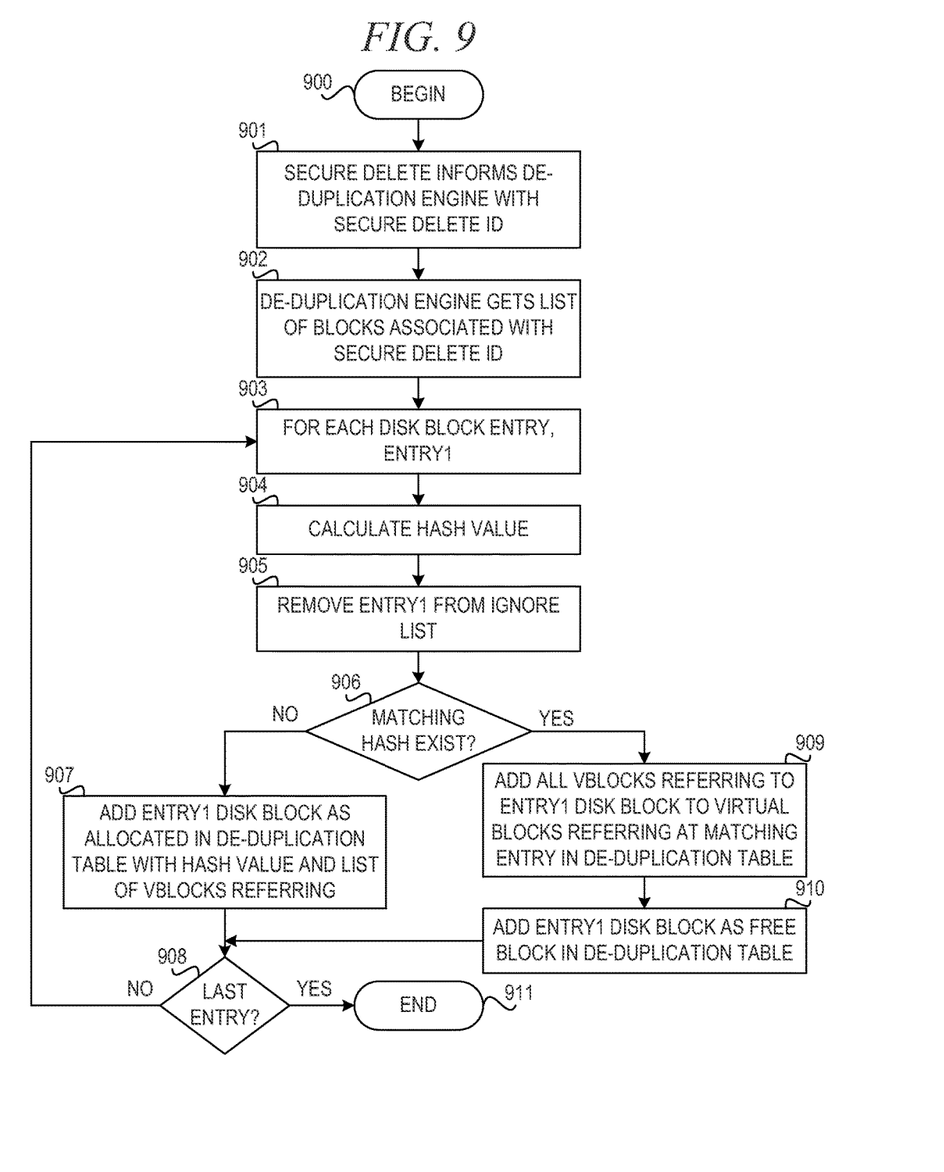
FIG. 9 is a flowchart illustrating operation of a mechanism for maintaining a de-duplication information table and an ignore list table at an end of the secure delete operation for the file in accordance with an illustrative embodiment.

FIG. 9 is a flowchart illustrating operation of a mechanism for maintaining a de-duplication information table and an ignore list table at an end of the secure delete operation for the file in accordance with an illustrative embodiment. At an end of the secure delete operation for the file, operation begins (block 900), and the secure delete logic informs the de-duplication engine with the secure delete ID (block 901). The de-duplication engine refers to the ignore list to get a list of blocks associated with the secure delete ID (block 902).

For each disk block entry associated with the secure delete ID in the ignore list (block 903), the mechanism calculates a hash value for the disk block associated with the entry (block 904) and removes the entry from the ignore list (block 905). The mechanism then refers to the de-duplication information table and determines whether a matching hash exists (block 906). If a matching entry does not exist, the mechanism adds the entry as allocated in the de-duplication information table with the hash value and the list of virtual blocks referring to the disk block (block 907). Then, the mechanism determines whether the entry is the last entry associated with the secure delete ID in the ignore list (block 908). If the entry is not the last entry, operation returns to block 903 to consider the next disk block entry associated with the secure delete ID.

If there is a matching entry in block 906, the mechanism adds all virtual blocks referring to the disk block of the current entry to the virtual blocks referring at the matching entry in the de-duplication table (block 909). The mechanism then adds the entry disk block as a free block in the de-duplication table (block 910). Then, the mechanism determines whether the entry is the last entry associated with the secure delete ID in the ignore list (block 908). If the entry is not the last entry, operation returns to block 903 to consider the next disk block entry associated with the secure delete ID.

If the entry is the last entry associated with the secure delete ID in the ignore list in block 908, then operation ends (block 911).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for performing de-duplication aware secure delete. Writes for secure delete are performed directly to the physical disk blocks without de-duplication processing. In the de-duplication table, if the given disk blocks are already referred by blocks belonging to some other files, the mechanism creates a separate copy of the blocks. The de-duplication engine maintains an ignore list to avoid de-duplication processing of the identified disk blocks. The secure delete mechanism then performs multiple step pattern writes on the file blocks. For any block write request, the de-duplication engine checks if the write request is for a block on the ignore list.

In one embodiment, the secure delete procedure can mark an ignored block with a special flag. Once all pointers of that block are removed/freed, the mechanism may add that block to the free block list. Before adding to the free list, the mechanism may check the special flag. If the flag is marked, the secure delete procedure can be performed on that disk block, and the block will be added to the free list at an end of the secure delete operation for the file.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for de-duplication aware secure delete, the method comprising:
   responsive to receiving a request for a secure delete operation for a file, identifying a list of file blocks to be securely deleted from a physical disk device, wherein identifying a list of file blocks to be securely deleted comprises creating one or more entries in an ignore list, wherein each entry in the one or more entries stores a secure delete identifier associated with the secure delete request, a disk block identifier of a corresponding disk block in the physical disk device, and one or more virtual blocks of the file referring to the corresponding disk block;
   responsive to determining at least one virtual block of another file refers to a given disk block corresponding to a file block in the list, copying the given disk block to generate a copied disk block in the physical disk device;
   updating a pointer of the at least one virtual block to refer to the copied disk block; and
   writing a secure delete pattern for each file block in the list of file blocks to a disk block in the physical disk device without performing de-duplication processing.

2. The method of claim 1, wherein writing the secure delete pattern to the given disk block comprises:
   responsive to a request to write to a first virtual block, determining whether the first virtual block refers to a first disk block in the ignore list; and
   responsive to the first virtual block referring to a first disk block in the ignore list, writing the secure delete pattern to the first disk block without performing de-duplication processing on the first disk block.

3. The method of claim 2, further comprising:
   responsive to a request to write to a second virtual block, determining whether the second virtual block refers to a second disk block in the ignore list; and
   responsive to the second virtual block not referring to a disk block in the ignore list, performing de-duplication processing on the second virtual block.

4. The method of claim 1, wherein writing the secure delete pattern for each file block in the list of file blocks comprises at an end of the secure delete operation for the file:
   for each entry in the ignore list:
   calculating a hash value for the corresponding disk block;
   removing the entry from the ignore list; and
   responsive to a matching entry existing in a de-duplication table with a matching hash value, adding all virtual blocks referring to the corresponding disk block in the ignore list to the virtual blocks referring to the disk block in the matching entry and adding the corresponding disk block as free in the de-duplication table.

5. The method of claim 4, wherein writing the secure delete pattern for each file block in the list of file blocks further comprises at an end of the secure delete operation for the file:
   responsive to a matching entry not existing in a de-duplication table, adding the corresponding disk block as allocated in the de-duplication table with the hash entry and list of virtual blocks referring to the corresponding disk block.

6. The method of claim 1, further comprising:
   removing each disk block in the list of disk blocks to be securely deleted from a de-duplication table.

7. A computer program product comprising a non-transitory computer readable storage medium having a computer readable program stored therein, wherein the computer readable program, when executed on a computing device, causes the computing device to:
   responsive to receiving a secure delete request for a file, identify a list of file blocks to be securely deleted from a physical disk device, wherein identifying a list of file blocks to be securely deleted comprises creating one or more entries in an ignore list, wherein each entry in the one or more entries stores a secure delete identifier associated with the secure delete request, a disk block identifier of a corresponding disk block in the physical disk device, and one or more virtual blocks of the file referring to the corresponding disk block;

responsive to determining at least one virtual block of another file refers to a given disk block corresponding to a file block in the list, copy the given disk block to generate a copied disk block in the physical disk device;

update a pointer of the at least one virtual block to refer to the copied disk block; and write a secure delete pattern for each file block in the list of file blocks to a disk block in the physical disk device without performing de-duplication processing.

8. The computer program product of claim 7, wherein writing the secure delete pattern to the given disk block comprises:

responsive to a request to write to a first virtual block, determining whether the first virtual block refers to a first disk block in the ignore list; and responsive to the first virtual block referring to a first disk block in the ignore list, writing the secure delete pattern to the first disk block without performing de-duplication processing on the first disk block.

9. The computer program product of claim 8, wherein the computer readable program further causes the computing device to:

responsive to a request to write to a second virtual block, determine whether the second virtual block refers to a second disk block in the ignore list; and responsive to the second virtual block not referring to a disk block in the ignore list, perform de-duplication processing on the second virtual block.

10. The computer program product of claim 7, wherein writing the secure delete pattern for each file block in the list of file blocks comprises at an end of the secure delete operation for the file:

for each entry in the ignore list:
calculating a hash value for the corresponding disk block;
removing the entry from the ignore list; and
responsive to a matching entry existing in a de-duplication table with a matching hash value, adding all virtual blocks referring to the corresponding disk block in the ignore list to the virtual blocks referring to the disk block in the matching entry and adding the corresponding disk block as free in the de-duplication table.

11. The computer program product of claim 10, wherein writing the secure delete pattern for each file block in the list of file blocks further comprises at an end of the secure delete operation for the file:

responsive to a matching entry not existing in a de-duplication table, adding the corresponding disk block as allocated in the de-duplication table with the hash entry and list of virtual blocks referring to the corresponding disk block.

12. The computer program product of claim 7, wherein the computer readable program further causes the computing device to:

remove each disk block in the list of disk blocks to be securely deleted from a de-duplication table.

13. The computer program product of claim 7, wherein the computer readable program is stored in a computer readable storage medium in a data processing system and wherein the computer readable program was downloaded over a network from a remote data processing system.

14. The computer program product of claim 7, wherein the computer readable program is stored in a computer readable storage medium in a server data processing system and wherein the computer readable program is downloaded over a network to a remote data processing system for use in a computer readable storage medium with the remote system.

15. An apparatus, comprising:
a processor; and
a memory coupled to the processor, wherein the memory comprises instructions which, when executed by the processor, cause the processor to:
responsive to receiving a secure delete request for a file, identify a list of file blocks to be securely deleted from a physical disk device, wherein identifying a list of file blocks to be securely deleted comprises creating one or more entries in an ignore list, wherein each entry in the one or more entries stores a secure delete identifier associated with the secure delete request, a disk block identifier of a corresponding disk block in the physical disk device, and one or more virtual blocks of the file referring to the corresponding disk block;

responsive to determining at least one virtual block of another file refers to a given disk block corresponding to a file block in the list, copy the given disk block to generate a copied disk block in the physical disk device;

update a pointer of the at least one virtual block to refer to the copied disk block; and write a secure delete pattern for each file block in the list of file blocks to a disk block in the physical disk device without performing de-duplication processing.

16. The apparatus of claim 15, wherein writing the secure delete pattern to the given disk block comprises:

responsive to a request to write to a first virtual block, determining whether the first virtual block refers to a first disk block in the ignore list; and responsive to the first virtual block referring to a first disk block in the ignore list, writing the secure delete pattern to the first disk block without performing de-duplication processing on the first disk block.

17. The apparatus of claim 16, further comprising:

responsive to a request to write to a second virtual block, determining whether the second virtual block refers to a second disk block in the ignore list; and responsive to the second virtual block not referring to a disk block in the ignore list, performing de-duplication processing on the second virtual block.

18. The apparatus of claim 15, wherein writing the secure delete pattern for each file block in the list of file blocks comprises at an end of the secure delete operation for the file:

for each entry in the ignore list:
calculating a hash value for the corresponding disk block;
removing the entry from the ignore list;
responsive to a matching entry existing in a de-duplication table with a matching hash value, adding all virtual blocks referring to the corresponding disk block in the ignore list to the virtual blocks referring to the disk block in the matching entry and adding the corresponding disk block as free in the de-duplication table; and
responsive to a matching entry not existing in a de-duplication table, adding the corresponding disk block as allocated in the de-duplication table with the hash entry and list of virtual blocks referring to the corresponding disk block.

19. The apparatus of claim 18, wherein writing the secure delete pattern for each file block in the list of file blocks further comprises at an end of the secure delete operation for the file:

responsive to a matching entry not existing in a de-duplication table, adding the corresponding disk block as allocated in the de-duplication table with the hash entry and list of virtual blocks referring to the corresponding disk block.

20. The apparatus of claim 15, wherein copying the given disk block to generate the copied disk block comprises:

getting a free disk block from a de-duplication table as a new disk block;

assigning the at least one virtual block of the another file to the new disk block; and writing data of the given disk block to the new disk block.

\* \* \* \* \*